Sept. 7, 1937.  J. W. PAGE  2,092,556
BUCKET AND TRUNNION
Filed June 8, 1936  2 Sheets-Sheet 1
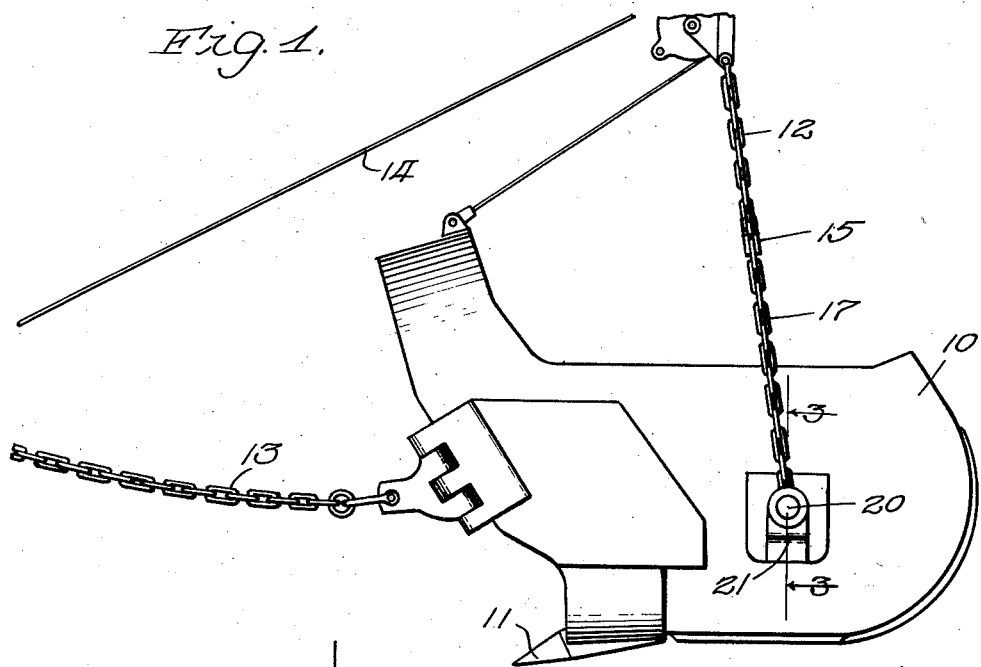
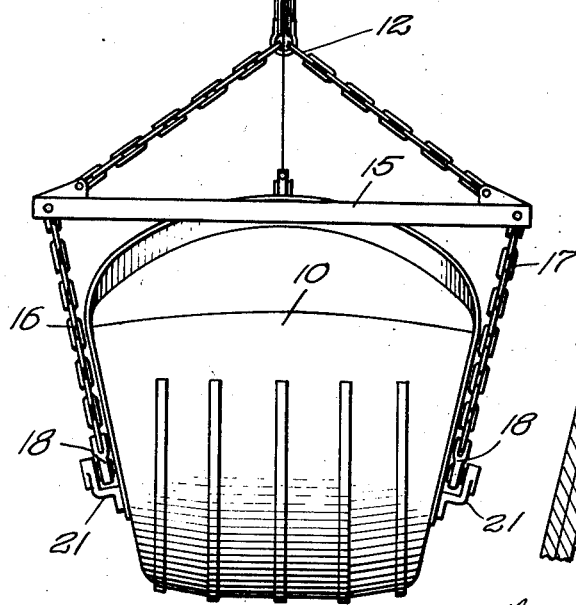
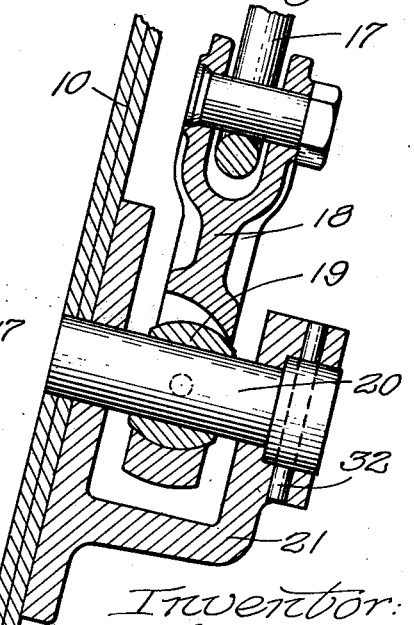
Inventor:
John W. Page,
By Dyrenforth, Lee, Chritton, Wiles,
Attys.

Sept. 7, 1937.  J. W. PAGE  2,092,556
BUCKET AND TRUNNION
Filed June 8, 1936  2 Sheets-Sheet 2
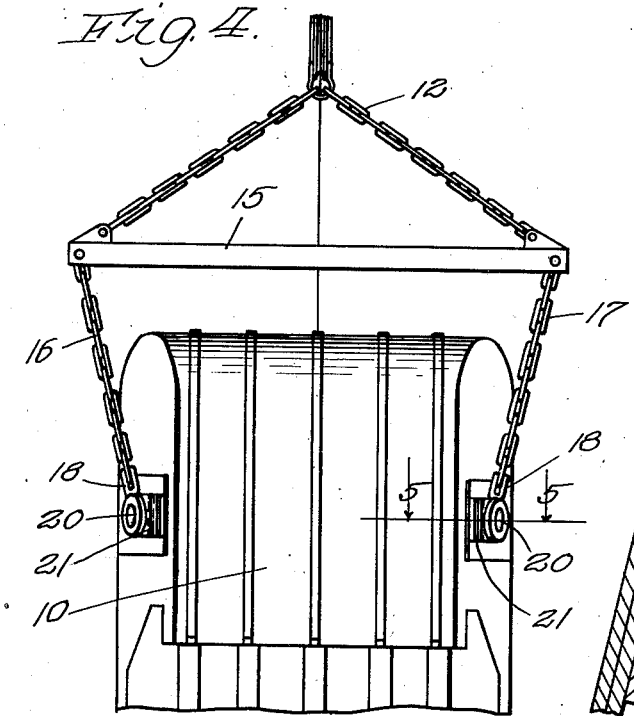
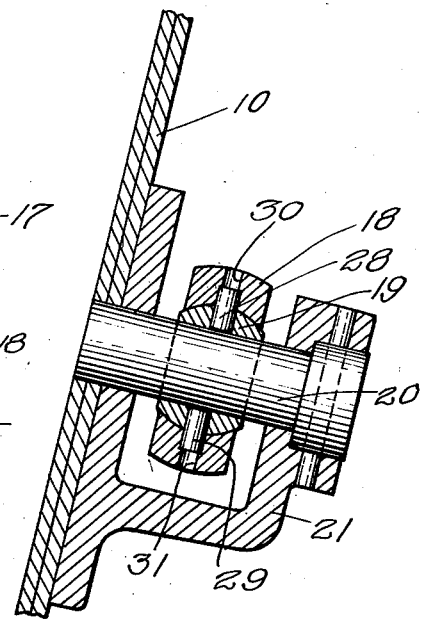
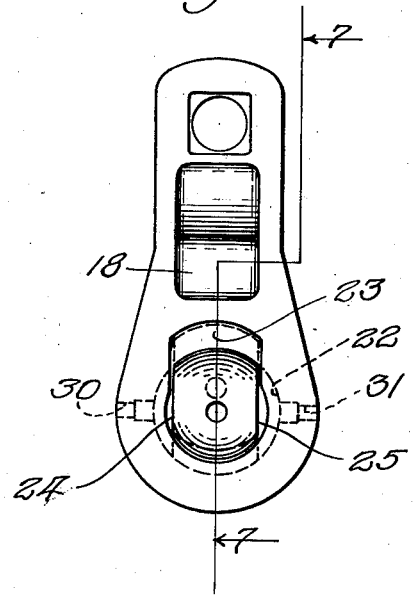
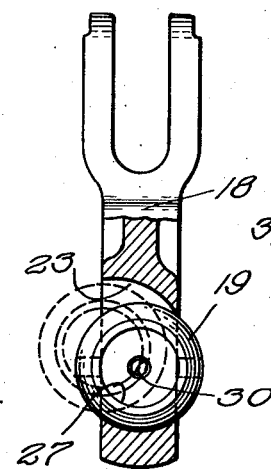
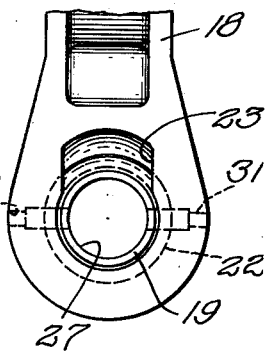
Inventor.
John W. Page,
By Dynaforth, Lee, Chritton & Wiles,
Attys.

Patented Sept. 7, 1937

2,092,556

UNITED STATES PATENT OFFICE 2,092,556

BUCKET AND TRUNNION

John W. Page, Chicago, Ill., assignor to Page Engineering Company, Chicago, Ill., a corporation of Illinois Application June 8, 1936, Serial No. 84,204

4 Claims. (Cl. 37—135)

This invention relates to a bucket and trunnion, and more particularly to a ball and socket support for the trunnion.

One feature of this invention is that the ball and socket support compensates for changes in position of the trunnion; another feature of this invention is that the support may be readily assembled in the field; another feature of this invention is that the ball may be placed in its socket and locked therein without the necessity of a separable socket member; other features and advantages of the present invention will be apparent from the following specification and the drawings, in which—

Fig. 1 is a side view of the bucket; Fig. 2 is a back view of the bucket; Fig. 3 is a sectional view of the trunnion and support, along the line 3—3 of Fig. 1; Fig. 4 is a back view of the bucket in dropped position; Fig. 5 is a sectional view along the line 5—5 of Fig. 4; Fig. 6 is a side elevation of the socket member; Fig. 7 is a view partly in section, along lines 7—7 of Fig. 6; and Fig. 8 is a view similar to Fig. 6, but showing the ball member in locked position within the socket.

The mounting of a standard bracket and trunnion on the side of a bucket having downwardly sloping sides results in the trunnion being at an angle with the axis about which the bucket revolves when it is dropped to empty the contents thereof. It has been found preferable, therefore, to incorporate ball and socket joints between the bearing member carrying the trunnion and the chain or other supporting means connected to the bail of the bucket. Such ball and socket joints have heretofore been made with separable socket members, which were bolted around the ball member when the bucket was assembled in the field. In addition to the fact that the interior of the socket member was thus not a smooth socket, it required tools in the field and a separation of parts which resulted in frequent inconvenience.

The present invention comprises a ball and socket joint support for a trunnion so constructed and arranged that the ball member may be placed in the socket member and locked therein without any tools or any separation of the socket member. It is only necessary to place the socket member in position within the trunnion bracket, drop the ball member into the socket, rotate it 90° to lock it therein, and then slip the trunnion through the opening in the ball member provided therefor. This results in a support for the bucket which cannot be disassembled without removal of the trunnion, and which has all of the advantages incident to a ball and socket joint.

Referring more particularly to the drawings, in the particular embodiment of this invention illustrated herewith, a bucket 10 provided with cutting teeth 11 is carried by a supporting chain 12 and operated by a drag line or chain 13 and the control line 14. The supporting chain 12 carries a bail 15 having at each end thereof bucket chains 16 and 17. These chains provide supporting means for the socket members 18 having therein ball members 19. The ball member 19 is adapted to be journaled on, and to carry, a trunnion 20, which in turn supports the bucket 10, being attached thereto by the trunnion bracket 21. It will be noted, referring more particularly to the back view of the bucket shown in Fig. 2, that the sides of the bucket 10 slope inwardly. The trunnions and trunnion brackets are standard forms and are adapted to be bolted or otherwise held to the sides of the bucket with the trunnion perpendicular to the plane of the bucket side. Since the bucket side is not vertical, however, the trunnion is at an angle to the axis of rotation, and thus there preferably is some provision to take the twisting stresses which would otherwise be set up in the chains when the bucket was dropped from horizontal position. In the present embodiment of this invention the ball and socket joint is so arranged as to take this twist in one plane, but is pinned in such a way that the twist in the other plane is taken by the links of the chain.

Referring more particularly to Figs. 6, 7 and 8, the socket member 18 has therein a socket 22 having through one side thereof a filling slot 23. This filling slot has a vertical dimension or length at least as large as the diameter of the ball member, but a width which is less than the diameter of said member. The ball member 19 has opposite flattened sides 24 and 25, and an opening or bearing 27 through the center thereof adapted to receive and support the trunnion 20. The shape of the ball member may be considered somewhat analogous to that of a napkin ring, so that its width from one flattened side to the opposite flattened side is less than the diameter of the ball member. Thus the ball member may be slipped into the socket through the filling slot, and then rotated substantially 90°. By this rotation the full diameter of the ball is opposed to any possibility of withdrawal of the ball, since the width of the filling slot 23 is considerably less than the diameter of the ball member.

When it is desired to assemble the support for the bucket in the field the ball member is slipped into the socket through the filling slot and then rotated substantially 90°, as described. Pins 28 and 29 are then slipped into the openings 30 and 31, shouldered to prevent the pins passing out through the socket members. The socket member and ball are then placed in position within the trunnion bracket 21, and the load member or trunnion 20 slipped through the openings provided for it in the bracket 21 and through the bearing or opening in the ball member 19, and finally locked in position in the bracket by the pin 32.

The pins 28 and 29 are used to lock the ball member 19 to the socket member so that there can be no rotation between the ball and socket on an axis coincident with the axis of the trunnion. This is preferable, since otherwise when the bucket was dropped and raised the rotation would frequently come between the ball member and socket member rather than between the trunnion 20 and the bearing surface provided for it in the opening through the ball member 19. The socket member is, of course, free to move about the ball member with the pins 28 and 29 as an axis in order to take up one of the twists heretofore mentioned caused by the fact that the trunnions are at an angle to the axis of rotation of the bucket.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. Apparatus of the character described, including: a bucket; a trunnion on said bucket at an angle to the axis of rotation thereof; a socket member having a socket adapted to retain a ball member and having a filling slot through one side into said socket, said slot having a width less than, and a length at least equal to, the diameter of said ball member; and a ball member having opposite flattened sides permitting it to be inserted into said socket through said slot and having an opening therethrough adapted to receive said trunnion, said ball member being adapted to be rotated substantially 90° after insertion to lock it in said socket.

2. Apparatus of the character described, including: a bucket having inwardly sloping sides; a trunnion on one of said sides and substantially perpendicular thereto; a socket member having a socket adapted to retain a ball member and having a filling slot through one side into said socket, said slot having a width less than, and a length at least equal to, the diameter of said ball member; and a ball member having opposite flattened sides permitting it to be inserted into said socket through said slot, said ball member being adapted to be rotated substantially 90° after insertion to lock it in said socket, and said ball member having an opening therethrough substantially perpendicular to said sides adapted to rotatably receive said trunnion.

3. Apparatus of the character claimed in claim 2, including: means for locking said ball member in said socket member against rotation on an axis coincidental with that of said trunnion.

4. Apparatus of the character described, including: a bucket having opposite inwardly sloping sides; trunnions mounted on each of the opposite sides and substantially perpendicular thereto; a socket member having a socket adapted to retain a ball member and having a filling slot through one side into said socket, said slot having a width less than, and a length at least equal to, the diameter of said ball member; a ball member having opposite flattened sides permitting it to be inserted into said socket through said slot, said ball member being adapted to be rotated substantially 90° after insertion to lock it in said socket, and said ball member having an opening therethrough substantially perpendicular to the sides thereof adapted to rotatably receive one of said trunnions; means for locking said ball member in said socket member against rotation on an axis coincidental with that of said trunnion; and means for supporting said socket member.

JOHN W. PAGE.